Jan. 17, 1939.  W. H. LONGSTREET  2,144,427
FILLER BIBB
Filed Oct. 20, 1937
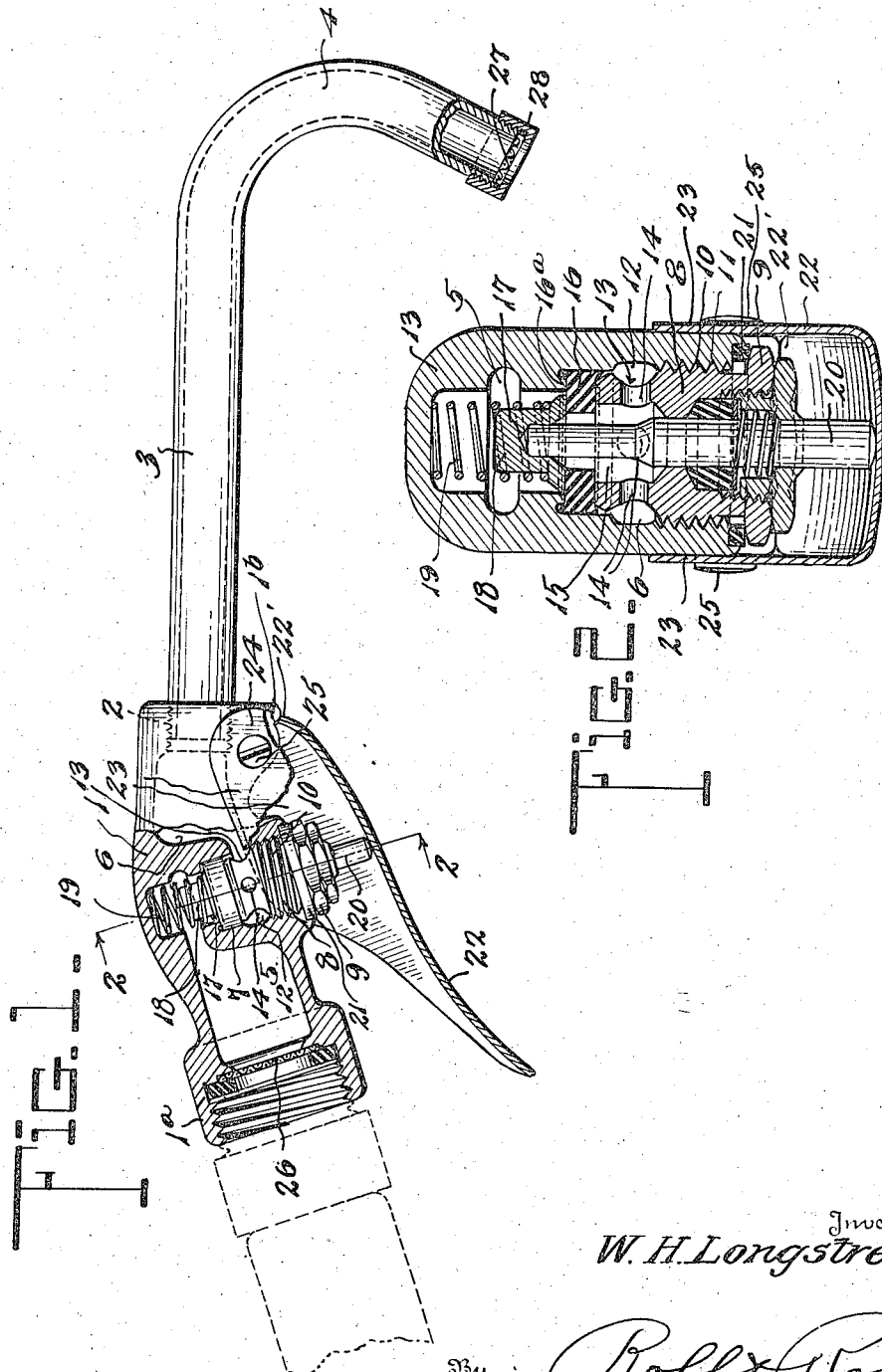
Inventor
W. H. Longstreet
By Robb & Robb
Attorneys Patented Jan. 17, 1939

2,144,427

UNITED STATES PATENT OFFICE 2,144,427

FILLER BIBB

Walter H. Longstreet, Brooklyn, N. Y., assignor to Acme Air Appliance Company, Inc., Brooklyn, N. Y., a corporation of New York Application October 20, 1937, Serial No. 170,105

1 Claim. (Cl. 251—137)

The present invention relates to improvements in filler bibbs or faucets of the type designed for water supply lines or hose, such as employed in service stations for filling automobile radiators or the like.

It is quite well known that these appliances, in such use as above referred to, are subjected to much abuse in which the operating parts are frequently damaged or broken, particularly the operating or grip lever as well as the cut-off valve actuated thereby, resulting in leakage of the valve and inefficiency of operation.

One of the primary objects, therefore, of this invention is to provide a construction and arrangement of the operating handle so that not only is the valve stem amply protected at all times thereby, but the handle or lever itself so cooperates with the body of the bibb in such a manner as to prevent bending or breakage of the handle and pinching of the hand by the handle during manipulations.

A further object of the invention is to provide a novel valve unit permitting ready assembly and installation or removal, while affording a leak-proof cut-off so desirable in these constructions.

Other and further objects and advantages of the invention will be hereinafter set forth and the novel features thereof defined by the appended claim.

In the drawing:

Fig. 1 is a side elevation of my invention, parts being broken away and shown in section; and Fig. 2 is an enlarged sectional view taken on the line 2—2 of Fig. 1.

Like reference characters designate corresponding parts in the several figures of the drawing.

Specifically describing the invention, I designates the hollow body portion of the faucet having the enlarged internally threaded end 1a for connection with the hose line from a source of water supply. At the other end the body extends at an angle from a point substantially midway and in a threaded opening 2 a nozzle tube 3 is screwed, said tube being curved into a hook extremity 4, so conveniently formed as to engage over the mouth of the radiator filling tube or hang upon a supporting hook.

The body portion is so cast as to provide the two end passages 5 and 6 with an intermediate transverse connecting passage 7, in the latter of which the valve unit, now to be described, is seated.

This valve unit is composed of the plug 8, having the wrench hold 9 at one end and the threaded intermediate portion 10 adapted to be screwed into the threaded entrance 11 of the transverse passage 7. At a point coinciding with the constricted entrance 12 of the passage 6, the plug is grooved as indicated at 13 and in the base of the groove a plurality of transverse passages 14 lead to the inner longitudinal bore 15 of the plug.

Upon the end of the plug a valve seat or washer 16 of rubber or the like is mounted and clamped by the plug against the annular seat 16a. This washer is formed with an annular lip on either side so as to provide a leak-proof seat for the valve member proper 17 which has a reduced end 18 to receive the spring 19 for normally holding the valve against the flat face of the washer.

Lastly, the valve stem or plunger 20 extends through the bore 15 and the washer into contact with the valve, said stem being reduced in diameter at its inner end to provide ample passage for the fluid through the plug. A gasket 21 completes the valve unit assembly.

The valve stem projects from the plug into contact with the grip handle or lever 22 which is specially shaped so as to provide lateral guide flanges 23 designed to slidably contact with the sides of the body portion about the valve stem and the assembly. Ears 24 at the end of the grip piece are connected to the end of the body portion, and at the under side thereof, by means of the pivot screws 25. At the pivoted end the handle grip is formed with a transverse flange 22' which is engageable with the shoulder 1b at the end of the body so as to limit the movement of the grip by the valve spring 19.

It will be apparent that the handle member is so constructed and arranged as to cover and protect the valve stem at all times, as well as guide the movements of the grip and reinforce it against bending. It will readily unseat the valve 17 when pressed upon by the fingers as the hand grasps the bibb. Movement of the valve from the constricted to the enlarged part of the passage 7 and vice versa controls the force of the water flow.

A filter screen 26 is preferably disposed at the connecting end of the body, and a second screen 27 may also be disposed at the end of the nozzle tube and held in place by a knurled thimble 28.

Having thus described my invention, what I claim as new and desire to secure by Letters Patent is:

A faucet appliance of the class described comprising a body member having end passages extending longitudinally thereof interrupted by an intermediate valve passage extending transversely, said valve passage being formed with a seat, a valve unit in said valve passage composed of a plug member formed with a longitudinal bore extending therethrough and enlarged bores extending inwardly from each end of the plug member, lateral passages extending from one of said counterbores communicating with said transverse passage externally of the plug, a washer clamped against the seat by one end of the plug member, a valve in said transverse passage at the other side of said washer having a stem receiving bore extending partly therethrough, a valve seating spring for holding the valve against said washer, a valve operating stem extending through the plug member for unseating the valve, an annular packing surrounding said stem and seated in one of the said counterbores of said plug, a compression spring in said counterbore for seating said packing, and a secondary apertured plug in the counterbore constituting a bearing member for said valve stem counterbored to receive said packing spring and retain the packing in said bore.

WALTER H. LONGSTREET.